Figure 1:
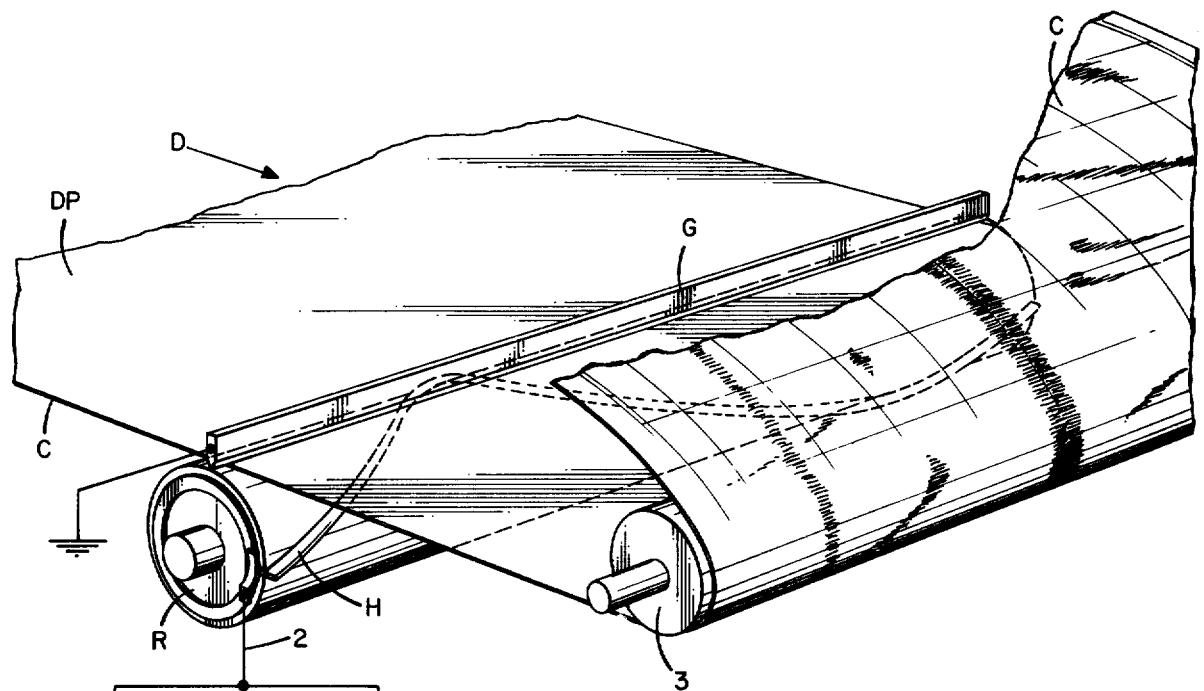
Figure 1:
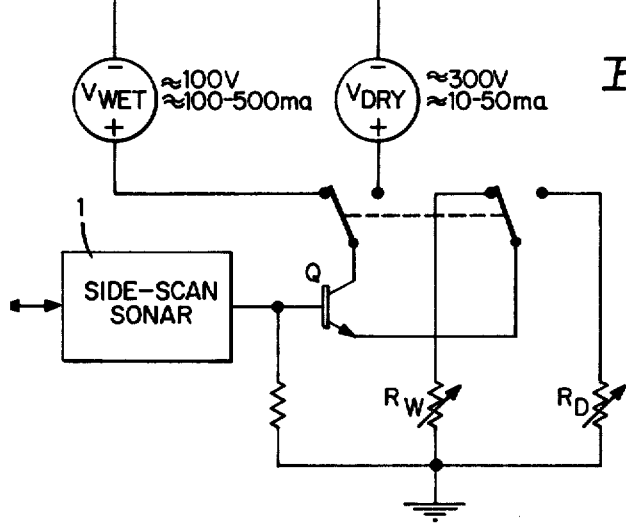

United States Patent [19]

Klein

[11] 4,137,538

[45] Jan. 30, 1979

[54] PROCESS AND APPARATUS FOR COMPATIBLE WET AND DRY PAPER SIGNAL RECORDING

[75] Inventor: Martin Klein, Salem, N.H.

[73] Assignee: Klein Associates, Inc., Salem, N.H.

[21] Appl. No.: 823,608

[22] Filed: Aug. 11, 1977

[51] Int. Cl.² ............................................. G03G 17/02
[52] U.S. Cl. .................................................. 346/165
[58] Field of Search ....................... 346/165, 162, 163; 358/300

[56] References Cited

U.S. PATENT DOCUMENTS

| | | | |
|---|---|---|---|
| 3,166,752 | 1/1965 | Waterman | 346/165 |
| 3,233,244 | 2/1966 | Winterhalter | 346/165 |
| 3,491,365 | 1/1970 | Desautels | 346/165 |
| 3,546,707 | 12/1970 | Dixon | 346/165 |
| 3,596,283 | 7/1971 | Baumann | 346/165 |
| 3,769,629 | 10/1973 | Sambucetti | 346/165 |

*Primary Examiner*—Jay P. Lucas
*Attorney, Agent, or Firm*—Rines and Rines, Shapiro and Shapiro

[57] ABSTRACT

This disclosure is concerned with adapting helical electrode-grounding electrode signal recording apparatus, normally suitable for wet paper signal recording, alternatively to operate with dry coated recording paper of the type previously recordable upon by point stylii and the like, through a combination of novel signal feeding circuits, electrode shaping, paper orientation and electrode pressure.

12 Claims, 2 Drawing Figures

U.S. Patent
Jan. 30, 1979
4,137,538

PROCESS AND APPARATUS FOR COMPATIBLE WET AND DRY PAPER SIGNAL RECORDING

The present invention relates to a process and apparatus for compatible wet and dry paper signal recording, being particularly, though not exclusively, concerned with recording side-scan sonar signals and the like.

The art is replete with signal paper or chart recording systems used for decades in facsimile, wire signal transmission, sonar, geophysical, medical and other systems to display the received signals upon a chart record. The recording papers have generally been of two principal types: (1) so-called "wet paper" containing chemicals that, in the presence of moisture, cause darkening of the paper as an iron-containing electrode contacts the moist paper and electric current is applied between the electrode and a further cooperative electrode contacting the opposite side of the paper; and (2) "dry paper" that is electro-sensitive and is contacted by one or more fine point spring wire or similar stylii to effect a burning at the point in response to an electric signal applied to the stylus, thus effecting a signal-responsive dark markening of the paper under the stylus point.

The first type of "wet paper", such as the type marketed under the trademark "Alfax" by Alden Electronic & Impulse Recording Equipment Co., Inc. of Westboro, Mass. widely used in side-scan sonar and similar recording applications, has the advantages of wide tone-shade capability, relatively odor-free operation in recording, readily adaptable multichannel display, scratch resistance, and jitterless presentation. Typical operating signal voltages and currents with cooperative helical and grounding electrodes are in the range of about 100 volts, more or less, and relatively high 100–500 milliampere currents.

The "dry paper", sometimes referred to as, teledeltos paper, such as the "NDK" type marketed by Fitchburgh Coated Paper Co., of Scranton, Pa., has the advantage of enabling much slower operation than is feasible with the moist or wet paper (1 to 8 seconds per sweep, for example, as compared with, say, a maximum of 1 second for the wet paper, permitting longer sonar range displays and high dimensional stability. Operation with dry paper does introduce odor and the paper can be easily scratched. Particularly when multiple wire stylii are used, jitter can be introduced into the display. Typical operating signal voltages are relatively high, of the order of 300 volts, with relatively low currents of the order of 10-15 milliamperes; and these electro-sensitive papers have heretofore required point stylii with relatively light pressures, say of the order of 3 to 15 grams, to produce the burn markings thereupon.

It has previously been recognized that it would be highly advantageous to be able to use, interchangeably, wet and dry paper charts with the same signal apparatus; but heretofore this has not been feasible except with the provision of alternative signal electrode marking systems, one adapted for the characteristics of each type of paper. As an example, the said Alden company, through its subsidiary, Ocean Sonics Inc., of El Segundo, Calif., provides an adapter to convert its sonar recorder for shallow water sounding uses and the like to dry paper recording—but with a separate electrode marking assembly and not the same helical electrode system employed with the wet paper recording. Such adapters are described in current brochures of said Ocean Sonics Inc. entitled "DPA-1000 and DPA-2000 Dry Electro Sensitive Paper Adapter" and "Oceanographic Survey Recorder Model OSR-119T" with "Optional Dry Electrosensitive Paper Adapter 'DPA-1000'". Wet paper conductive helical and grounding electrode recording systems are described, for example, in U.S. Pat. Nos. 2,540,081; 2,621,999; 2,655,427; 2,776,181 and 2,789,029; and 2,962,340.

Underlying the present invention is the rather startling discovery that, through appropriate signal processing, electrode shaping and pressure and paper orientation, the very same helical and grounding electrode assemblies used for wet paper electrochemical recording may be directly used with dry paper; and, if desired, with precisely the same signal levels. That this has been contraindicated by experience in this art is evident from the prior requirement for separate types of electrode marking systems and/or adapters, above mentioned, and by the previous conviction in the art that the electrosensitive dry papers required point stylii of relatively low spring pressure to effect high resolution burn marks, and with relatively high voltages (as much as three times that used for electrochemical wet paper signal marking) and relatively low currents (one-tenth and lesser fractions of the currents required for the iron electrode-water-chemical composition marking reaction of the wet papers).

An object of the present invention, accordingly, is to provide a new and improved process and apparatus for attaining compatible wet and dry paper signal recording with a common electrode marking system, despite the vastly different characteristics and previously believed incompatible signal-marking requirements of these vastly different types of recording paper.

A further object is to provide such a novel process and apparatus that employs cooperative conductive helical and grounding electrodes, particularly, although by no means exclusively, adapted for sonar signal recording, and enabling the same apparatus to be used more versatilely for operations ranging from shallow sounding (displayed with the wet paper) to deep sonar profiling (displayed with the dry paper)—and all with, for example, the flick of a switch. The terms "grounding" or "ground" as above and hereinafter used are intended generically to embrace actual earthing, or chassis or other reference potential.

Other and further objects will be explained hereinafter and are more particularly pointed out in the appended claims. In summary, from one of its aspects, the invention embraces a process of enabling dry electric-signal recording paper having a chemically coated display surface normally susceptible to electric-discharge marking as a wire spring-pressured relatively high voltage, low-current-carrying stylus point engages the same to be interchanged with wet paper having chemical treatment for producing a chemical darkening reaction in the presence of moisture and relatively high electrical current at relatively low voltage, normally passed across the same between a moving helical conductive edge rather than a stylus wire point and a grounding conductive edge, the process comprising inserting the said dry recording paper between the helical conductive edge and said grounding conductive edge; establishing contact pressure therebetween in excess of the range of pressures normally used for wire spring-pressured stylii; and drawing the electric-discharge to the edge adjacent said coated display surface of said dry recording paper while rotating the signal-provided helical edge against the paper. Preferred details and constructions are hereinafter presented.

Figure 2:
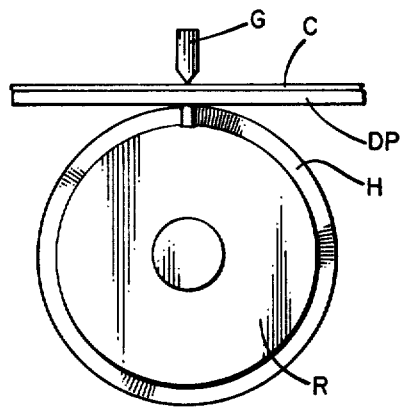

The invention will now be described with reference to the accompanying drawing,

FIG. 1 of which is a fragmentary perspective view illustrating the converted operation of the invention from wet to dry paper recording; and FIG. 2 is a fragmentary elevation of a modification.

Referring to FIG. 1, the invention is illustrated as applied to the previously described sonar utilization, with the transceiver being schematically represented at 1, transmitting and receiving one or more beams of underwater sound pulses. Equipment of this type is described, for example, in my previous articles "Sonar-A Modern Technique for Ocean Exploration", IEEE Spectrum, June, 1968; "Side-Scan Sonar", Undersea Technology, April, 1967; "Sonar Serendipity in Loch Ness", M.I.T. Technology Review, December, 1976 and articles therein referenced; and my previous U.S. Pat. No. 3,975,704. In accordance with a preferred embodiment, the received echo signals are fed to a constant current transistor stage Q having its collector connected to a conventional approximately 100 volt voltage source $V_{WET}$ and its emitter grounded through an adjustable resistance $R_W$ to provide the required high currents (say, 100–500 milliamperes) for effecting wet paper electrochemical marking. The signal current from the stage Q is shown applied at 2 to the rotating drum-carried helical steel electrode H, as by rotary slip ring R or similar connections described in the first-named Letters Patent, above. A steel grounding bar electrode G is cooperatively mounted above the drum so that the wet recording paper (not shown) may be received between the same and be contacted on the upper surface by the grounding electrode G and on the lower surface by the moving helical electrode H. In this fashion, single or multiple channel signal records are electrochemically marked on the wet paper as described in said Letters Patent and articles.

In accordance with the present invention, it has been found that dry paper, DP, illustrated in FIG. 1 as orientated with its coated side facing downward and a carbon-coated side facing upward, may be substituted directly for the wet paper, being passed in the direction D with the coated side engaging the drum-carried helical electrode H and the uppper side contacting the grounding electrode G. By properly shaping the contacting electrode surfaces and applying pressure in excess of those generally used by point stylii customarily required to burn-mark the coated dry paper surface, it has been found that, surprisingly, high resolution marking of the dry paper can be produced with the very same helical and grounding electrodes H and G normally used for wet paper, and with the relatively low voltage and high currents used with dry paper, as applied from the constant current source Q, and as distinguished from the normal relatively high burning voltages and small currents of stylii recording, as previously discussed. Specifically, by developing an electrode edge that is somewhat sharp or fine (say, of the order of 10 thousandths of an inch) and, with electrode pressures on the dry paper of the order of say, 150 grams, (and with or without biasing potential applied to one of the electrodes, as desired) an electric discharge may be forced to be drawn to that electrode touching the coated side C of the paper thus to burn-mark the same; in this example, to the bottom side touching the helical electrode. For exposed viewing, the paper may have its direction reversed by the forward drive 3, or other reversing schemes, including mirrors, may be used.

Should it be desired to vary the burn effect on the dry paper coated surface C, as for different texture, resolution or tonal effects, the ganged switches $S_1$ and $S_2$ in the collector and emitter connections of the stage Q may be switched to the right-hand positions to substitute a more conventional high voltage source $V_{DRY}$, with more conventional low currents being attained by variable emitter resistance $R_D$, appropriately altering the signal drive output of stage Q.

Through appropriate thinning (and/or bias potential) at the grounding electrode G, FIG. 2, and appropriate pressure, the discharge may be drawn thereto to permit the coated surface C of the dry paper DP to be passed face upward against G, thus enabling direct viewing at all times.

Further modifications will also suggest themselves to those skilled in this art, and such are considered to fall within the spirit and scope of the invention as defined in the appended claims.

What is claimed is:

1. A process for enabling dry electric-signal recording paper having a chemically coated display surface normally susceptible to electric-discharge marking as a wire spring-pressured relatively high voltage, low-current-carrying stylus point engages the same to be interchanged with wet paper having chemical treatment for producing a chemical darkening reaction in the presence of moisture and relatively high electrical signal current at relatively low voltage, normally passed across the same between a moving helical conductive edge, rather than a stylus wire point, and a grounding conductive edge, the process comprising inserting the said dry recording paper between the helical conductive edge and said grounding conductive edge; establishing contact pressure therebetween in excess of the range of pressures normally used for wire spring-pressured stylii; and drawing the electric-discharge to the edge adjacent said coated display surface of said dry recording paper while rotating the signal-provided helical edge against the paper.

2. A process as claimed in claim 1 and in which the current of the signal provided between said edges is applied with substantially the same said relatively low voltage and relatively high signal current used for recording on the said wet paper.

3. A process as claimed in claim 1 and in which the said relatively low voltage and relatively high signal current produced between said edges for wet recording paper is altered somewhat to raise the voltage and lower the current for operation with the said dry recording paper.

4. A process as claimed in claim 1 and in which at least one of thinning an edge and applying appropriate edge potential is employed to determine the edge at which the electric discharge is drawn, and thus the appropriate orientation of the coated display surface relative to said edges.

5. A process as claimed in claim 4 and in which said coated display surface is disposed face downward adjacent said helical edge and the surface is thereafter reversed to expose the same to view.

6. A process as claimed in claim 4 and in which the grounding conductive edge is thinned to draw the discharge thereto and the coated display surface is oriented to contact the grounding conductive edge.

7. Recording apparatus for sonar signals and the like having, in combination, juxtaposed relatively movable helical and grounding conductive edge electrodes;

means for inserting dry electric-signal recording paper having a chemically coated display surface normally susceptible to electric-discharge marking in pressure contact between said edge electrodes; at least one of said edge electrodes being thinned to determine where the electric discharge is drawn and adjacent which edge said coated display surface of the dry paper bears; means for drawing said paper between said edge electrodes during rotation of the helical edge electrode; constant-current means for applying relatively low voltage of the order of substantially a hundred volts and relatively high currents of the order of one to several hundred milliamperes normally used for wet recording paper to said edge electrodes.

8. Recording apparatus as claimed in claim 7 and in which means is provided for contacting the helical edge electrode against the coated display surface of the dry paper.

9. Recording apparatus as claimed in claim 8 and in which said helical edge electrode is below the paper and means is provided for thereafter reversing the paper to expose the signal-recorded surface to view.

10. Recording apparatus as claimed in claim 7 and in which the said grounding conductive edge is thinned to draw the discharge thereto and the coated display surface is orientated to contact the grounding conductive edge.

11. Recording apparatus as claimed in claim 7 and in which means is provided for applying appropriate edge electrode potential to determine the edge to which the electric discharge is drawn.

12. Recording apparatus as claimed in claim 7 and in which means is provided for altering said constant-current means somewhat to raise the voltage and lower the current, respectively.

* * * * *